United States Patent [19]

Bloombaum et al.

[11] 4,172,821

[45] Oct. 30, 1979

[54] BITUMEN EMULSIONS

[75] Inventors: Barry D. Bloombaum, Luton; Michael J. Hitch, Buntingford, both of England

[73] Assignee: Imperial Chemical Industries Limited, London, England

[21] Appl. No.: 896,024

[22] Filed: Apr. 12, 1978

[30] Foreign Application Priority Data

Apr. 19, 1977 [GB] United Kingdom ............... 16171/77

[51] Int. Cl.² ............................................. C08L 91/00
[52] U.S. Cl. .............................. 260/28.5 AS; 106/277; 260/28.5 D; 404/72
[58] Field of Search .................. 260/28.5 AS, 28.5 D; 106/277; 404/72

[56] References Cited

U.S. PATENT DOCUMENTS

| | | | |
|---|---|---|---|
| 4,018,730 | 4/1977 | McDonald | 260/28.5 AS |
| 4,040,996 | 8/1977 | Van Vonno | 260/28.5 D |

FOREIGN PATENT DOCUMENTS

| | | |
|---|---|---|
| 79790 | 2/1971 | German Democratic Rep. |
| 87153 | 1/1972 | German Democratic Rep. |
| 1255218 | 11/1967 | Fed. Rep. of Germany . |
| 191400 | 2/1967 | U.S.S.R. |

*Primary Examiner*—Melvyn I. Marquis
*Attorney, Agent, or Firm*—Cushman, Darby & Cushman

[57] ABSTRACT

An aqueous emulsion of controlled stability is derived from a cationic bitumen emulsion and a vinyl chloride polymer made by aqueous emulsion or microsuspension polymerization using an anionic emulsifying agent. The emulsion is preferably made by adding additional cationic emulsifying agent to the bitumen emulsion before admixture with the vinyl chloride polymer (which can be in latex or spray-dried form). A method for making the emulsion and a method of road-surfacing using the emulsion are also claimed.

17 Claims, No Drawings

BITUMEN EMULSIONS

The present invention relates to bitumen emulsions, to a method for their preparation, and to their use in road-surfacing.

The use of bitumen for road-surfacing is widespread. The bitumen is normally applied as a hot flowable mass or as an emulsion which may be anionic or cationic. The use of cationic emulsions (i.e. aqueous emulsions in which the cation of the emulsifying agent is at the interface of the bitumen particle) in this respect is very popular since they are known to precipitate very evenly on contact with road surfaces and/or aggregates used in road-surfacing. The various types of cationic bitumen emulsions are described in British Standards specification, BS 434: Part 1: October 1973, of the British Standards Institution, 2 Part Street, London WIA 2BS. They vary from those which rapidly precipitate on contact with road-surfacing or aggregate to those in which precipitation is sufficiently delayed to permit mixing with aggregates so that a "slurry seal" is obtained.

It has been proposed that the use of vinyl chloride polymers in admixture with bitumen imparts desirable physical properties to the bitumen in the context of its utility in road-surfacing. Hitherto such mixtures have been prepared by mixing bitumen and vinyl chloride polymer particles in a dry state at an elevated temperature (e.g. 90°-150° C.). This is rather unsatisfactory because the preparation, storage and application of such a mixture would be very inconvenient commercially and furthermore the elevated temperature during preparation, storage and application would degrade the vinyl chloride polymer.

According to the present invention there is provided an aqueous emulsion of controlled stability derived from a cationic bitumen aqueous emulsion containing an effective amount of cationic emulsifying agent(s) and a vinyl chloride polymer(s) made by aqueous emulsion or microsuspension polymerisation using anionic emulsifying agent(s).

There is also provided according to the present invention a method preparing an aqueous emulsion of controlled stability of bitumen and a vinyl chloride polymer(s) which process comprises mixing a cationic bitumen aqueous emulsion containing an effective amount of cationic emulsifying agent(s) and a vinyl chloride polymer(s) made by aqueous emulsion or microsuspension polymerisation.

By an aqueous emulsion of bitumen and a vinyl chloride polymer(s) of controlled stability is meant an emulsion which is stable after its preparation (and can therefore be stored for a prolonged period without precipitation occurring) until it is contacted with a road surface or an aggregate of the type used in road-surfacing whereupon it will undergo precipitation.

Such a vinyl chloride polymer-modified bitumen emulsion may be readily and conveniently applied to a road surface, its preparation and storage may be at ambient temperature and its application may be a fairly low temperature (e.g. about 60° C.) so that degradation of the vinyl chloride polymer is not incurred.

Vinyl chloride polymers which have a particle size suitable for the formation of an aqueous emulsion with bitumen are those formed by aqueous emulsion or microsuspension polymerisation. Such polymerisations are mostly carried out in the presence of an anionic emulsifying agent. Examples of anionic emulsifying agents include the sodium salts of sulphated and sulphonated hydrocarbons and fatty acids such as dioctyl sodium sulphosuccinate, sulphonated diesel oil and sodium lauryl sulphate and the sodium salts of alkyl aryl sulphonates, particularly sodium dodecyl benzene sulphonate which is very widely used in vinyl chloride polymerisations.

It might have been expected that an anionic emulsifying agent associated with the vinyl chloride polymer would render any cationic bitumen emulsion inherently unstable and very liable to precipitate. Surprisingly this has been found not to be the case and an emulsion of controlled stability, with a shelf life of e.g. several days or longer, can be formed with a vinyl chloride polymer made using anionic emulsifying agent(s) and a cationic bitumen emulsion provided that the bitumen emulsion contains an effective amount of cationic emulsifying agent(s) before admixture with the vinyl chloride polymer. By an effective amount of cationic emulsifying agent is meant an amount which results in the formation of a vinyl chloride polymer-modified bitumen aqueous emulsion of controlled stability. The effective amount of cationic emulsifying agent(s) may be incorporated into the bitumen emulsion either by adding the total amount of cationic emulsifying agent(s) to be used during the preparation of the bitumen emulsion, or, more preferably, by adding a portion of the total amount of cationic emulsifying agent(s) to be used during the preparation of the bitumen emulsion and adding the remaining portion of the total amount of cationic emulsifying agent(s) to be used subsequent to the preparation of the bitumen emulsion but before admixture of the bitumen emulsion with the vinyl chloride polymer.

Cationic bitumen emulsions are available commercially or can be readily made (e.g. by shearing with water and emulsifying agent in a colloid mill) with commercially available emulsifier packages. The emulsifying agents employed are normally coded by the manufacturer so that it is difficult to ascertain their precise chemical constitution. However they are thought mostly to be some type of quaternary ammonium compound.

If emulsifying agent is added subsequent to the preparation of the bitumen emulsion it may be any conveniently available cationic emulsifying agent. Examples of suitable cationic emulsifying agents include quaternary ammonium compounds such as stearamidopropyl dimethyl-$\beta$-hydroxy-ethyl ammonium nitrate, cetyl pyridinium chloride, cetyl trimethyl ammonium bromide, dodecyl trimethyl ammonium bromide, dodecyl ammonium chloride, N-dodecyl propylene-1,3-diamine hydrochloride and N-octadecyldiethanolamine hydrochloride. Such emulsifying agents can also be used for the preparation of the bitumen emulsion initially.

The minimum amount of subsequently added cationic emulsifying agent to use should be ascertained by simple experimentation as this will depend, inter alia, on the particular bitumen emulsion being employed and the nature of the additional cationic emulsifying agent itself. Generally an amount of 0.5 to 1.5% by weight (based on bitumen solids content) is adequate.

The cationic emulsifying agent will generally be added to the bitumen as an aqueous solution and the achievement of a vinyl chloride polymer-modified bitumen latex of controlled stability may also be dependent on the pH of the added solution of emulsifying agent. For example, an aqueous solution N-octadecyl-diethanolamine hydrochloride should have a pH of about 1–1.5 if the modified bitumen latex is to be acceptably stable. The possibility of any dependence of stability on pH should be determined experimentally for each individual emulsifying agent or emulsifying agent system.

The vinyl chloride polymer may be mixed with the cationic bitumen emulsion while it is in the form of an aqueous latex—i.e. the mixing operation may comprise latex blending. Alternatively the dried vinyl chloride polymer (e.g. in the form of a spray-dried powder) may be mixed with the bitumen latex, surprisingly this technique does not give rise to any dispersion or stability problems.

By a vinyl chloride polymer is meant a vinyl chloride homopolymer or a vinyl chloride copolymer. Examples of suitable comonomers include vinyl esters such as vinyl acetate, acrylic esters such as methyl acrylate and butyl methacrylate, acrylic nitriles such as acrylonitrile and methacrylonitrile, unsaturated diesters such as diethyl maleate, allyl esters such as allyl acetate, α-olefines such as ethylene and propylene, vinyl ethers and styrene compounds.

The amount of vinyl chloride polymer to use in the emulsion with bitumen will vary according to the desired modified properties of the blended product. However an amount of 1–10% by weight, preferably 3–7% by weight, based on the dry bitumen weight, is generally adequate for most road-surfacing operations.

The vinyl chloride polymer when used in conjunction with bitumen according to the invention advantageously modifies the physical properties of the bitumen, for example it increases the tensile strength of the bitumen, increases its energy to break and renders it more likely to undergo ductile failure as against brittle failure when subjected to a low temperature. Thus the emulsions of the invention are very suitable for use in road-surfacing operations.

Accordingly there is further provided a method of road-surfacing comprising applying to a road surface an aqueous emulsion of controlled stability of bitumen aqueous emulsion containing an effective amount of cationic emulsifying agent(s) and a vinyl chloride polymer(s) made by aqueous emulsion or microsuspension polymerisation using anionic emulsifying agent(s).

The present invention is now illustrated by the following Examples. These employed commercially available cationic bitumen emulsions. The bitumen emulsion used in Examples 1 to 3 contained 70% by weight bitumen (and was thought to contain the cationic emulsifying agent 'Actamul' CH1), while the bitumen emulsion used in Example 4 contained 72% by weight bitumen (and contained the cationic emulsifying agent 'Duomeen' T).

EXAMPLES 1,2

To a sample of the above-mentioned bitumen emulsion containing 70% by weight of bitumen was added 1% by weight (on bitumen) of 'Ethomeen' T12 hydrochloride emulsifying agent (belived to be N-octadecyldiethanolamine hydrochloride), the emulsifying agent being added as a 12% by weight aqueous solution (pH about 1). In separate experiments, 5% by weight (on bitumen) of a vinyl chloride homopolymer (having a viscosity number of 130 according to ISO/R174-1961E), prepared by aqueous emulsion polymerisation employing sodium dodecyl benzene sulphonate as emulsifying agent, was stirred into the bitumen latex, either as a spray-dried powder (Example 1) or as the aqueous latex from polymerisation (Example 2). Both of the resulting latices were very stable and had a shelf life of several days.

The vinyl chloride polymer-modified bitumen latices were broken in a vacuum desiccator using quartzite aggregate reduced to a mean size of 50 μm. The aggregate/bitumen blends were formed into parallel-sided specimens by extruding them (after first warming) as strip from a mastic gun and then moulding the strip in a parallel-sided brass/'Perspex' mould. The specimens were subjected to tensile testing at −20° C. on an Instron tensometer using a draw ratio of 10 mm/min. The forces to break were respectively 68.2 N (specimens from Example 1) and 65.0 N (specimens for Example 2).

EXAMPLE 3

A sample of the bitumen latex used for Examples 1 and 2 (but containing no vinyl chloride polymer) was broken as described above and subjected to tensile testing under the same conditions, the force to break was found to be 50.7 N.

EXAMPLE 4

A stable dispersion of bitumen and vinyl chloride polymer was prepared using the procedure of Example 1 but employing the bitumen emulsion containing 72% by weight of bitumen and a 20% by weight aqueous solution of 'Ethomeen' T12 hydrochloride emulsifying agent (pH about 3). The level of emulsifying agent used was again 1% by weight (on bitumen). The resulting latex was stored in a polyethylene bottle and when examined after 12 days was still stable.

We claim:

1. An aqueous emulsion of controlled stability which is stable to precipitation until contacted with a road surface or an aggregate of the type used in road surfacing, wherein said emulsion is derived from a mixture of a cationic bitumen aqueous solution containing an amount effective for controlled stability of at least one cationic emulsifying agent and at least one vinyl chloride polymer made by aqueous emulsion or microsuspension polymerization using at least one anionic emulsifying agent.

2. An aqueous emulsion according to claim 1 wherein the amount of said at least one vinyl chloride polymer in said emulsion is 1 to 10% by weight based on the dry bitumen weight.

3. A method of preparing an aqueous emulsion of controlled stability of bitumen and at least one vinyl chloride polymer which is stable to precipitation until contacted with a road surface or an aggregate of the type used in road surfacing, which method comprises mixing a cationic bitumen aqueous emulsion containing an amount effective for controlled stability of at least one cationic emulsifying agent and at least one vinyl chloride polymer made by aqueous emulsion or microsuspension polymerization using at least one anionic emulsifying agent.

4. A method according to claim 3 wherein said amount of said at least one cationic emulsifying agent is incorporated into the bitumen emulsion by adding the total amount of said cationic emulsifying agent to be used during the preparation of the bitumen emulsion.

5. A method according to claim 3 wherein said amount of said cationic emulsifying agent is incorporated into the bitumen emulsion by adding a portion of the total amount to said at least one cationic emulsifying agent to be used during the preparation of the bitumen emulsion and adding the remaining portion of the total amount of said cationic emulsifying agent to be used subsequent to the preparation of the bitumen emulsion but before admixture of the bitumen emulsion with said vinyl chloride polymer.

6. A method according to claim 3 wherein said vinyl chloride polymer is incorporated into the bitumen emulsion while it is in the form of an aqueous latex.

7. The method according to claim 3 wherein said vinyl chloride polymer is incorporated into the bitumen emulsion while it is in the form of a dried polymer.

8. A method according to claim 3 wherein said amount of said vinyl chloride polymer that is incorporated into the emulsion is 1 to 10% by weight based on the dry bitumen weight.

9. A method of road-surfacing comprising applying to a road surface an aqueous emulsion of controlled stability of bitumen and at least one vinyl chloride polymer which is stable to precipitation until contacted with a road surface or an aggregate of the type used in road surfacing, wherein said emulsion is derived from a mixture of a cationic bitumen aqueous emulsion containing an amount effective for controlled stability of at least one cationic emulsifying agent and at least one vinyl chloride polymer made by aqueous emulsion or microsuspension polymerization using at least one anionic emulsifying agent.

10. A method according to claim 9 wherein the emulsion applied to the road surface has been made by a method in which said effective amount of said cationic emulsifying agent is incorporated into the bitumen emulsion by adding the total amount of said cationic emulsifying agent to be used during the preparation of the bitumen emulsion.

11. A method according to claim 9 wherein the emulsion applied to the road surface has been made by a method in which said amount of said cationic emulsifying agent is incorporated into the bitumen emulsion by adding a portion of the total amount of said cationic emulsifying agent to be used during the preparation of the bitumen emulsion and adding the remaining portion of the total amount of said cationic emulsifying agent to be used subsequent to the preparation of the bitumen emulsion but before admixture of the bitumen emulsion with said vinyl chloride polymer.

12. A method according to claim 9 wherein said vinyl chloride polymer is incorporated into the bitumen emulsion while it is in the form of an aqueous latex.

13. A method according to claim 9 wherein said vinyl chloride polymer is incorporated into the bitumen emulsion while it is in the form of a dried polymer.

14. A method according to claim 9 wherein the amount of said vinyl chloride polymer used in the applied emulsion is 1 to 10% by weight based on the dry bitumen weight.

15. An aqueous emulsion according to claim 1 wherein the amount of said cationic emulsifying agent is 0.5 to 1.5% by weight based on the bitumen solids content.

16. A method according to claim 3 wherein the amount of said cationic emulsifying agent is 0.5 to 1.5% by weight based on the bitumen solids content.

17. A method according to claim 9 wherein the amount of said cationic emulsifying agent is 0.5 to 1.5% by weight based on the bitumen solids content.

* * * * *